United States Patent
Tang

(10) Patent No.: US 10,196,103 B2
(45) Date of Patent: Feb. 5, 2019

(54) SELF-MOVING DEVICE AND WALKING CONTROL METHOD THEREOF

(71) Applicant: Ecovacs Robotics Co., Ltd., Suzhou (CN)

(72) Inventor: Jinju Tang, Suzhou (CN)

(73) Assignee: Ecovacs Robotics Co., Ltd., Suzhou (CN)

( * ) Notice: Subject to any disclaimer, the term of this patent is extended or adjusted under 35 U.S.C. 154(b) by 0 days.

(21) Appl. No.: 15/126,549

(22) PCT Filed: Mar. 17, 2015

(86) PCT No.: PCT/CN2015/074394
§ 371 (c)(1),
(2) Date: Sep. 15, 2016

(87) PCT Pub. No.: WO2015/139617
PCT Pub. Date: Sep. 24, 2015

(65) Prior Publication Data
US 2017/0073025 A1    Mar. 16, 2017

(30) Foreign Application Priority Data

Mar. 17, 2014    (CN) .......................... 2014 1 0098467

(51) Int. Cl.
*G05D 3/00*    (2006.01)
*B62D 57/02*    (2006.01)
(Continued)

(52) U.S. Cl.
CPC ................ *B62D 57/02* (2013.01); *A47L 1/02* (2013.01); *G05D 1/0088* (2013.01);
(Continued)

(58) Field of Classification Search
CPC .................................................. B02J 11/0085
See application file for complete search history.

(56) References Cited

U.S. PATENT DOCUMENTS 4,613,528 A * 9/1986 Mueller .............. B05B 13/0627
                                                          118/305
5,720,077 A    2/1998 Nakamura
(Continued)

FOREIGN PATENT DOCUMENTS

CN    201050015        4/2008
CN    101913152 B    9/2011
(Continued)

OTHER PUBLICATIONS

International Search Report and Written Opinion dated Jun. 11, 2015, which issued in corresponding International Patent Application No. PCT/CN2015/074394 (17 pages).
(Continued)

*Primary Examiner* — Jess Whittington
(74) *Attorney, Agent, or Firm* — Nixon Peabody LLP

(57) ABSTRACT

The self-moving device comprises an outer frame (100), and a base body (200) rotatably connected on the outer frame (100). The base body (200) includes a control unit and a walking unit. A fixing pin (300) is connected to the base body (200). One end of the fixing pin (300) is movably fixed to the base body (200), and the other end is a pin head (320). When the pin head (320) is engaged within the pin slot (110), the base body (200) is connected to and engaged with the outer frame (100). When the pin head (320) is separated from the pin slot (110), the base body (200) rotates with respect to the outer frame (100). When the detection mechanism detects that the pin head (320) is engaged and fixed within the pin slot (110), the control unit controls the walking unit.

11 Claims, 4 Drawing Sheets

(51) Int. Cl.
*G05D 1/00* (2006.01)
*G05D 1/08* (2006.01)
*A47L 1/02* (2006.01)

(52) U.S. Cl.
CPC ........ *G05D 1/0891* (2013.01); *A47L 2201/00* (2013.01); *A47L 2201/04* (2013.01); *Y10S 901/01* (2013.01); *Y10S 901/47* (2013.01)

(56) References Cited

U.S. PATENT DOCUMENTS

| | | | |
|---|---|---|---|
| 2005/0015912 A1* | 1/2005 | Kim | A47L 5/34 15/319 |
| 2006/0151930 A1* | 7/2006 | Moncavage | B23Q 1/035 269/266 |
| 2008/0195253 A1* | 8/2008 | Kim | A47L 1/02 700/245 |
| 2008/0222837 A1 | 9/2008 | Kaffenberger | |
| 2012/0242059 A1* | 9/2012 | Wu | B62K 5/00 280/287 |
| 2013/0014782 A1 | 1/2013 | Ryu | |
| 2014/0067116 A1* | 3/2014 | Moon | A47L 9/2873 700/245 |
| 2014/0146161 A1* | 5/2014 | Sibai | B25J 5/007 348/84 |
| 2015/0183472 A1* | 7/2015 | Suh | B62D 31/006 296/181.7 |
| 2015/0251318 A1* | 9/2015 | Lv | A47L 9/009 180/8.1 |

FOREIGN PATENT DOCUMENTS

| | | |
|---|---|---|
| CN | 102591336 | 7/2012 |
| CN | 202751321 | 2/2013 |
| CN | 103565344 | 2/2014 |
| CN | 203802382 | 9/2014 |
| CN | 203802382 U | 9/2014 |
| EP | 1 752 077 A2 | 2/2007 |
| EP | 1913856 A1 | 4/2008 |
| EP | 2 420 169 A1 | 2/2012 |
| KR | 20110048375 A | 5/2011 |
| KR | 101187079 | 9/2012 |

OTHER PUBLICATIONS

Extended European Search Report for European Patent Application No. 2015764248.9, dated Dec. 12, 2017, 6 pages.

* cited by examiner

SELF-MOVING DEVICE AND WALKING CONTROL METHOD THEREOF

CROSS-REFERENCE TO RELATED APPLICATIONS

This application is a U.S. National Stage of International Patent Application No. PCT/CN2015/074394, filed on Mar. 17, 2015, which claims priority to Chinese Patent Application No. 201410098467.4, filed Mar. 17, 2014, each of which is hereby incorporated by reference herein in its entirety.

FIELD OF THE INVENTION

The present invention relates to a self-moving device and a walking control method thereof, belonging to a small household appliance manufacturing technology.

BACKGROUND OF THE INVENTION

With the appearance of a self-moving device such as a window-wiping robot, the work like wiping a window becomes simpler. How to wipe the window more efficiently becomes a development trend of the window-wiping robot, and apparently, the window-wiping efficiency of the window-wiping robot is improved if the window-wiping robot can rotate in situ at a side or corner of the window directly. Therefore, an engagement mechanism is necessary to facilitate a rotation in situ of the window-wiping robot and at the same time to also enable the window-wiping robot to be positioned according to a setting position after the rotation. Specifically, the window-wiping robot generally comprises a machine body and an outer frame, wherein the machine body is in a circular shape and has a movement function, and the outer frame is in a square shape and has a function of wiping the window. There are two connection states between the machine body and the outer frame, i.e., separation or engagement. When in a separation state, the machine body may rotate with respect to the outer frame; and when in an engagement state, the machine body is fixed with respect to the outer frame, and the outer frame can only rotate with the machine body together but they cannot rotate relatively. However, when such an engagement mechanism is employed in practice, the robot cannot work normally because the engagement mechanism is unable to be engaged in place due to a tiny deviation during rotation.

SUMMARY OF THE INVENTION

In view of the above disadvantages in the prior art, the technical problems to be solved by the present invention are to provide a self-moving device and a walking control method thereof, which can accurately and effectively detect a connection state between a base body and an outer frame, and can by means of detection and posture adjustment, ensure that the base body and the outer frame perform walking when in an engaged state. The structure is simple and sensitivity is high.

The technical problems to be solved by the present invention are solved by the following technical solutions.

A self-moving device comprises an outer frame and a base body rotatably connected on the outer frame. The base body is provided with a control unit and a walking unit. A fixing pin is connected to the base body, one end of the fixing pin is movably fixed to the base body and the other end of the fixing pin is a pin head. A pin slot is correspondingly provided in the outer frame. When the pin head is engaged and fixed within the pin slot, the base body is fixedly connected to and engaged with the outer frame; and when the pin head is separated from the pin slot, the base body is able to rotate with respect to the outer frame. The base body is provided with a detection mechanism. When the detection mechanism detects that the pin head is engaged and fixed within the pin slot, the control unit, according to a detection signal of the detection mechanism, controls the walking unit to execute a corresponding movement command.

The detection mechanism can be achieved with various structures. Specifically, in the first embodiment, the detection mechanism is an optical coupling sensor provided on the base body, and a blocking arm is protruded and provided at a periphery of the pin head. When the pin head is separated from the pin slot, the blocking arm is located in a signal transmission path of the optical coupling sensor; and when the pin head is engaged and fixed within the pin slot, the blocking arm is away from the signal transmission path of the optical coupling sensor.

The detection mechanism can also employ a Hall sensor or a limit switch, other than the above-described optical coupling sensor.

To reset the fixing pin conveniently, a spring is sleeved on the fixing pin. The spring is positioned between the base body and the pin head.

To be positioned conveniently, the optical coupling sensor is fixed to the base body by an optical coupling holder. Two ends of the optical coupling holder are correspondingly provided with a signal transmitter and a signal receiver respectively, and a gap for accommodating the blocking arm is provided between the signal transmitter and the signal receiver.

Instead of the above-described structure, in the second embodiment, the base body is provided with an electrical motor and a cam, wherein the cam is driven by the electrical motor and correspondingly drives the fixing pin to move; a spring is sleeved on the fixing pin and a blocking part is provided on the fixing pin, wherein the spring is positioned between the outer frame and the blocking part. Alternatively, in the third embodiment, the base body is provided with an electromagnet, wherein the fixing pin is provided on the electromagnet and is driven by the electromagnet.

The present invention also provides a walking control method of the self-moving device, specifically comprising: controlling the walking unit to execute a corresponding movement command when the detection mechanism detects that the base body and the outer frame are in an engaged state.

Specifically, the walking control method comprises the following steps:

Step 100: starting up the self-moving device;

Step 200: the self-moving device performing walking;

Step 300: by means of the control unit, controlling the base body to rotate when the self-moving device detects an obstacle during the walking; by means of the detection mechanism, detecting a position state of the base body and the outer frame; and proceeding to step 400 if an engaged state of the base body and the outer frame is detected, otherwise, performing a posture adjustment and repeating the detecting until the base body and the outer frame are in the engaged state; and Step 400: the self-moving device continuing to perform walking in a new direction.

More specifically, between the steps 100 and 200 there is a step 110: by means of the detection mechanism, detecting a position state of the base body and the outer frame; and proceeding to the step 200 if an engaged state of the base body and the outer frame is detected, otherwise, performing a posture adjustment and repeating the detecting until the base body and the outer frame are in the engaged state.

Specifically, the step 300 comprises the following steps:

Step 310: rotating the base body with respect to the outer frame a first preset angle; and Step 320: proceeding to the step 400 if the engaged state of the base body and the outer frame is detected, otherwise, adjusting the base body by rotating it a second preset angle until it is determined that an engagement in place is achieved.

The first preset angle in the step 310 is 90° or is that the base body continuously rotates 180°; and the second preset angle in the step 320 is ±15°.

In conclusion, the present invention provides a self-moving device and a walking control method thereof, which can accurately and effectively detect a connection state between a base body and an outer frame, and can by means of detection and posture adjustment, ensure that the base body and the outer frame perform walking when in an engaged state. The structure is simple and sensitivity is high.

Hereinafter, technical solutions of the present invention will be described in detail with reference to attached drawings and specific embodiments.

DETAILED DESCRIPTION OF EMBODIMENTS

First Embodiment of the Self-Moving Device

Figure 1:
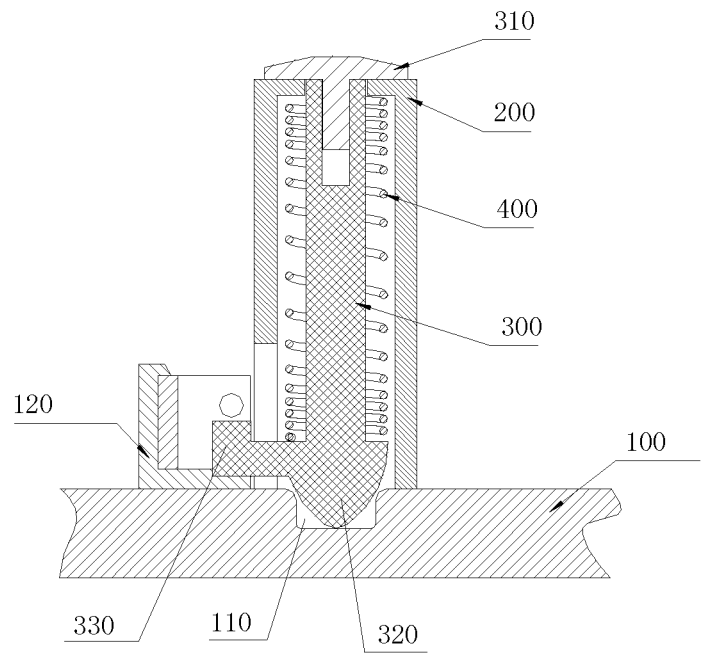
FIG. 1 is a schematic diagram of a partial structure according to a first embodiment of the self-moving device of the present invention in an engaged state.
Figure 2:
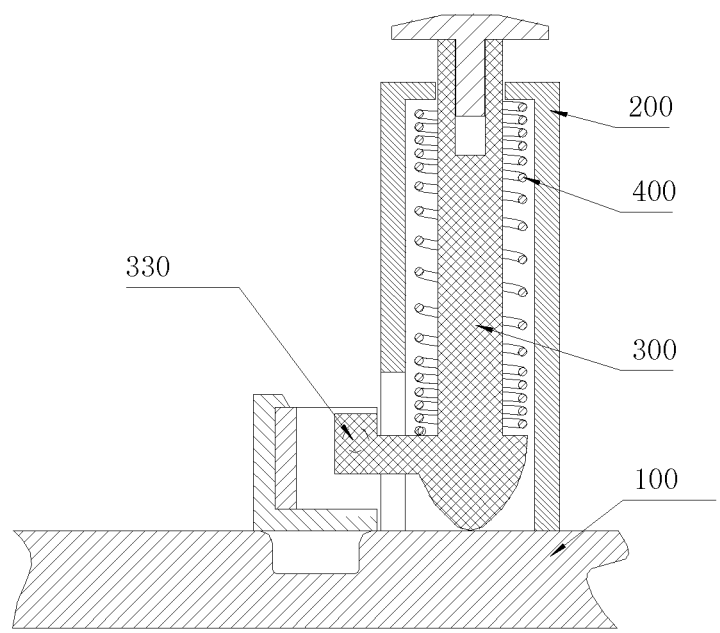
FIG. 2 is a schematic diagram of a partial structure according to the first embodiment of the self-moving device of the present invention in a released state.
Figure 3:
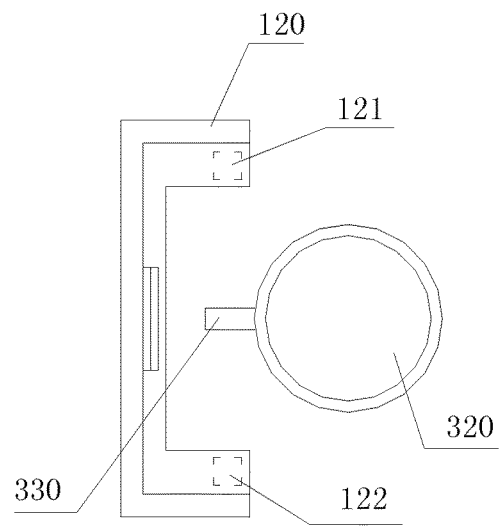
FIG. 3 is a schematic diagram of an operation principle according to the first embodiment of the self-moving device of the present invention.

FIG. 1 is a schematic diagram of a partial structure according to a first embodiment of the self-moving device of the present invention in an engaged state; FIG. 2 is a schematic diagram of a partial structure according to the first embodiment of the self-moving device of the present invention in a released state. As shown in FIG. 1 and with reference to FIG. 2, the present invention provides a self-moving device, which comprises an outer frame 100 and a base body 200 rotatably connected on the outer frame 100. The base body 200 is provided with a control unit and a walking unit. A fixing pin 300 is connected to the base body 200, one end of the fixing pin 300 is movably fixed to the base body 200 and the other end of the fixing pin 300 is a pin head. A pin slot 110 is correspondingly provided in the outer frame. When the pin head is engaged and fixed within the pin slot, the base body is fixedly connected to and engaged with the outer frame; and when the pin head is separated from the pin slot, the base body is able to rotate with respect to the outer frame. The base body is provided with a detection mechanism. When the detection mechanism detects that the pin head is engaged and fixed within the pin slot, the control unit, according to a detection signal of the detection mechanism, controls the walking unit to execute a corresponding movement command. As shown in FIG. 1, the fixing pin 300 is fixed to the base body 200 by a screw 310. The other end of the fixing pin 300 is the pin head 320, correspondingly to which the pin slot 110 is provided in the outer frame 100. When the fixing pin 300 moves downwards, the pin head 320 is engaged and fixed within the pin slot 110, making the outer frame 100 and the base body 200 locked, so that the outer frame and the base body cannot move relatively. When the fixing pin 300 moves upwards, the pin head 320 is separated from the pin slot 110 so that the base body 200 is able to rotate freely on the outer frame 100. With reference to FIG. 1 and FIG. 2, a spring 400 is sleeved on the fixing pin 300 to facilitate the fixing pin 300 to move up and down. The spring 400 is positioned between the base body 200 and the pin head 320. FIG. 3 is a schematic diagram of an operation principle according to the first embodiment of the self-moving device of the present invention. As shown in FIG. 3, an optical coupling sensor is provided on the base body, to conveniently detect whether a connection relationship between the outer frame and the base body is a locked or released state. The optical coupling sensor is fixed to the base body 200 by an optical coupling holder 120. In the embodiment shown in FIG. 3, the optical coupling holder 120 has a shape of "[", with two ends thereof correspondingly provided with a signal transmitter 121 and a signal receiver 122, respectively. Obviously, the shape is not limited to it, and the technical persons in the art may design a corresponding structure as required. A blocking arm 330 is protruded and provided on the pin head 320. A height of the blocking arm 330 is correspondingly set according to a height of a position where a signal transmission path between the signal transmitter 121 and the signal receiver 122 lies, so that the blocking arm 330 is located in the signal transmission path of the optical coupling sensor either when the pin head 320 is engaged and fixed within the pin slot 110 or when the pin head 320 is separated from the pin slot 110.

Figure 4:
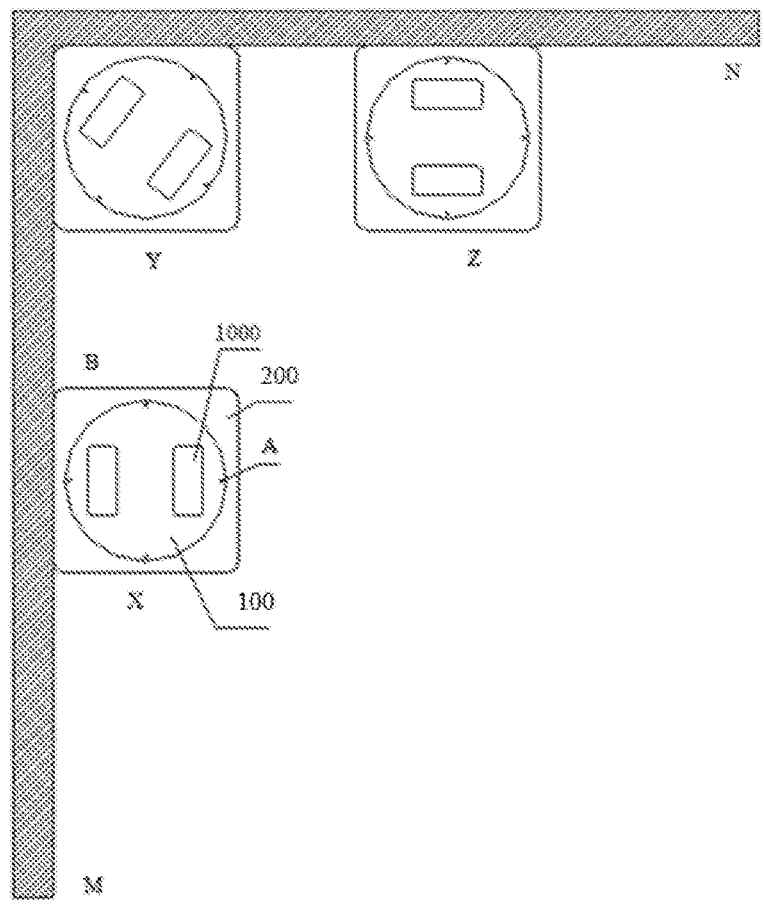
FIG. 4 is a schematic diagram of a movement direction of the self-moving device of the present invention.

FIG. 4 is a schematic diagram of a movement direction of the self-moving device of the present invention. With reference to FIG. 4, an operation process in the embodiment will be described in detail. The self-moving device B works on a surface of a glass with frames M and N, and the initial position of the self-moving device is located at X. At the moment, the self-moving device B travels normally along the frame M and moves in a straight line. Meanwhile, the base body 200 and the outer frame 100 are engaged with each other by an engagement mechanism A in a case that the pin head 320 is pressed into the pin slot 110 under the action of an elastic force of the spring 400, so that the base body 200 and the outer frame 100 move in a straight line together. As shown in FIG. 1 and with reference to FIG. 3, at this time, the height of the blocking arm 330 is lower than that of the signal transmission path of the optical coupling sensor, thus the signal transmitter 121 and the signal receiver 122 can communicate normally.

When the self-moving device B moves to a window corner Y formed by the frames M and N, the base body 200 needs to turn around under a driving force of a driving wheel 1000 provided at a bottom of the base body 100. When a rotation force is larger than the elastic force of the spring 400, the pin head 320 is lift up and released from the pin slot 110, and at this time the engagement mechanism A is unlocked. As the fixing pin 300 moves upwards, the height of the blocking arm 330 is increased. At this time, with reference to FIG. 2 and FIG. 3, the height of the blocking arm 330 is just located in the signal transmission path of the optical coupling sensor, making the signal transmitter 121 and the signal receiver 122 unable to communication normally, and the base body 200 rotates with respect to the outer frame 100. Upon rotating to a setting position, the engagement mechanism A makes the base body 200 and the outer frame 100 engaged and locked again, and both the base body and the outer frame continue to move in a straight line together along the frame N, i.e., at a position Z in the drawing.

In other words, when the base body and the outer frame are in an disengaged state, the blocking arm blocks the signal from being transmitted and received; and when the base body and the outer frame are in the engaged state, the blocking arm does not block the signal from being transmitted and received, so that the robot receives the signal and proceeds to the next operation after it is determined that a rotation of the robot is completed and an engagement is achieved. The self-moving device performs walking normally, the engagement mechanism is disengaged after the self-moving device receives a signal for turning around, and the base body rotates with respect to the frame by a first preset angle, which may be 90°. At this time, it is determined whether a signal from the optical coupling sensor is received or not; if received, it is determined that an engagement in place is achieved, and the base body and the outer frame perform walking towards a new direction; or if not received, the base body is adjusted by rotating it a second preset angle which may be ±15° until it is determined that an engagement in place is achieved. Note that in the embodiment, when rotating the base body a preset angle to adjust the base body, it is not necessary to rotate to a particular angle, and the engagement may be achieved during the rotation. For example, in a process of rotating 90°, if an engaged position is reached at 85°, the base body and the outer frame are engaged under the action of the elastic force of the spring.

After the self-moving device is started up on the glass, if the signal receiver 122 receives a transmission signal from the signal transmitter 121, the base body and the outer frame are engaged. If the signal receiver 122 receives no transmission signal from the signal transmitter 121, the base body is separated from the outer frame, and the base body begins to turn left or right or rotate left and right alternately. Until a transmission signal of the signal transmitter 121 is detected, the base body and the outer frame are engaged.

When the self-moving device works on a glass without any frames, the base body and the outer frame are always kept in an engaged state during the self-moving device's working. When the self-moving device works on a glass with a frame, the engagement between the base body and the outer frame is also kept unless the outer frame of the self-moving device becomes to contact the frame. When the self-moving device moves to a fame and a frame or corner of the glass, the base body is separated from the outer frame, the base body rotates to a new position where it is detected that the base body and the outer frame are engaged again, then the base body moves with the outer frame together towards a new direction.

Second Embodiment or the Self-Moving Device

Figure 5:
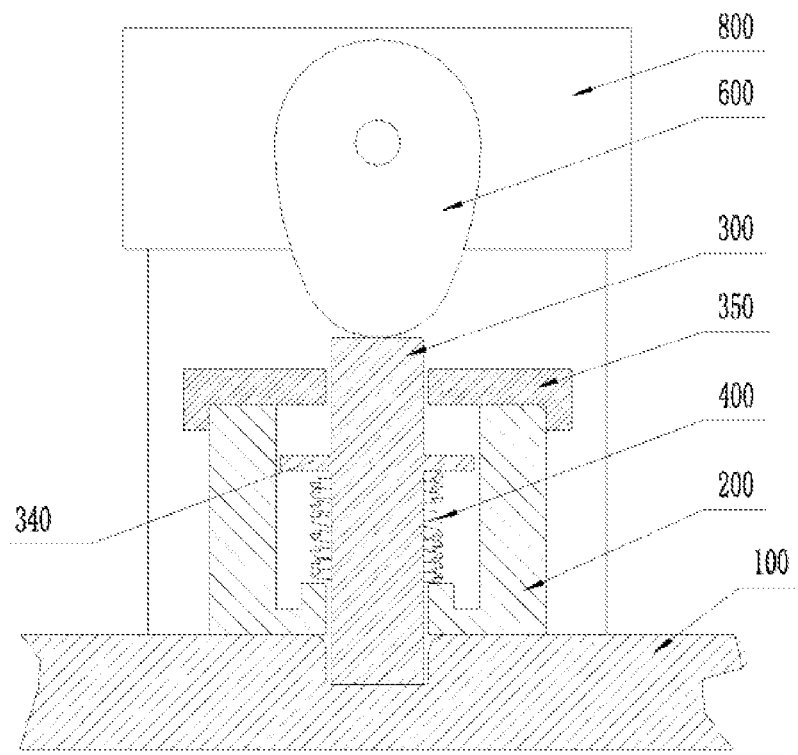
FIG. 5 is a schematic diagram of a partial structure according to a second embodiment of the self-moving device of the present invention in an engaged state.

FIG. 5 is a schematic diagram of a partial structure according to a second embodiment of the self-moving device of the present invention in an engaged state. As shown in FIG. 5, in this embodiment, the rotation and engagement structure provided on the self-moving device is different from that in the first embodiment. While a mechanical type structure is used in the first embodiment, an electrical motor control type structure is used in the second embodiment. Specifically, in this embodiment, an electrical motor 800 is provided above the base body 200. The electrical motor 800 is connected to a cam 600 and drives it to rotate so that the rim of the cam 600 abuts against the top of the fixing pin 300. A spring 400 is sleeved on the fixing pin 300 and a blocking part 340 is provided on the fixing pin 300. The spring 400 is positioned between the outer frame 100 and the blocking part 340.

The electrical motor control type engagement mechanism in this embodiment allows the fixing pin 300 on the base body 200 to be inserted into and lift up from the pin slot 110 of the outer frame 100 by means of the cam 600 and the spring 400. It facilitates the base body 200 and the outer frame 100 to rotate and to be fixed relatively, thus ensuring that the walking direction of the robot is perpendicular to corresponding sides of a supporter of cleaning cloth. Specifically, in order to be fixed conveniently, the fixing pin 300 is fixed to the base body 200 by a holder 350, and the spring 400 is mounted between the fixing pin 300 and the base body 200. The cam 600 controlled by the electrical motor 800 is mounted above the fixing pin 300. The pin slot 110 is provide at a corresponding position on the outer frame 100. With reference to FIG. 4, when the self-moving device is in a normally traveling state, the cam 600 rotates down to press the fixing pin 300 into the pin slot 110, making the outer frame 100 stuck to prevent it from shaking. When the self-moving device moves forwards to a side or corner of the window, a side of the outer frame 100 abuts against the frame of the window and cannot rotate, and at this moment, the cam 600 is lift up so that the fixing pin 300 is lift up from the pin slot 110 under the action of a restoring force of the spring 400, and the base body 200 of the self-moving device rotates with respect to the outer frame 100 under the driving force of the driving wheel. When the base body 200 rotates to a setting position, the driving wheel does not apply a rotation force any more, and the cam 600 rotates downwards again to press the fixing pin 300 into the corresponding pin slot 110 on the outer frame 100, making the outer frame 100 stuck.

The other technical features in this embodiment, especially how to achieve a detection of whether a connection relationship between the outer frame and the base body is a locked or released state by a cooperation of the optical coupling sensor and the blocking arm 330 protruded and provided on the pin head 320, are similar to those in the first embodiment, and the description thereof is not repeated herein.

Third Embodiment of the Self-Moving Device

Figure 6:
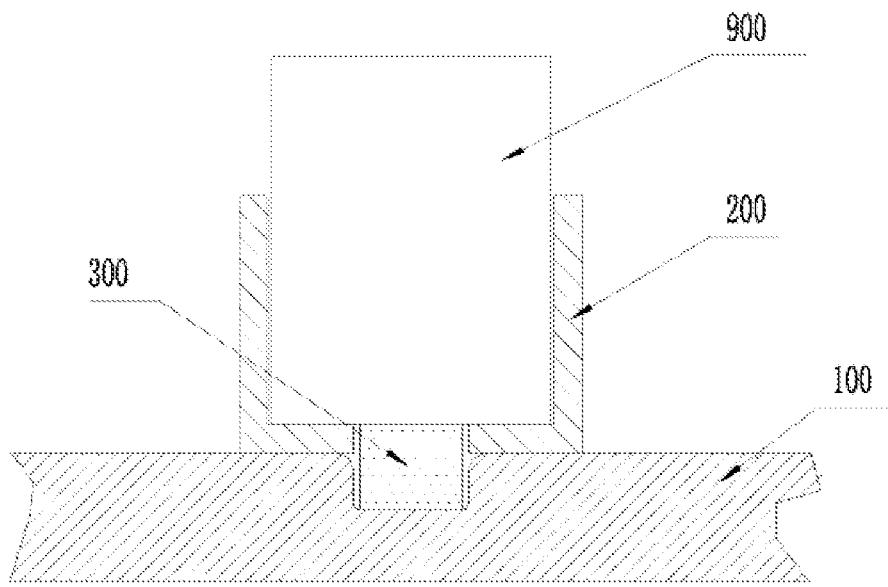
FIG. 6 is a schematic diagram of a partial structure according to a third embodiment of the self-moving device of the present invention in an engaged state.

FIG. 6 is a schematic diagram of a partial structure according to a third embodiment of the self-moving device of the present invention in an engaged state. As shown in FIG. 6, in this embodiment, the rotation and engagement structure provided on the self-moving device is different from those in the first and second embodiments. While the mechanical type structure and the electrical motor control type structure are used in the first and second embodiments respectively, an electromagnet control type structure is used in this embodiment. Specifically, in the embodiment, the base body 200 is provided with an electromagnet 900, and the fixing pin 300 is provided on the electromagnet 900, to achieve a relative rotation between the base body 200 and the outer frame 100. It is achieved that the fixing pin 300 on the electromagnet is inserted into and lift up from the pin slot 110 of the outer frame 100 by means of the characteristics of the electromagnet. It facilitates the base body 200 and the outer frame 100 to rotate and to be fixed relatively. Specifically, the fixing pin 300 is inside the electromagnet 900, and the extension and the retraction of the fixing pin 300 are controlled by a circuit. The electromagnet 900 is mounted on the base body 200. The pin slot 110 is provided at a corresponding position on the outer frame 100. As shown in FIG. 6, when the robot is in a normally traveling state, the electromagnet 900 operates to allow the fixing pin 300 to be extended and pressed into the pin slot 110, making the outer frame 100 stuck and preventing it from shaking. Meanwhile, it is ensured that a side of the outer frame 100 is perpendicular to the direction along which the robot moves forwards. With reference to FIG. 4, when the robot moves forwards to aside or corner of the window, the side of the outer frame 100 abuts against the frame of the window and cannot rotate. At this time, the electromagnet 900 receives a signal again, causing the fixing pin 300 to be lift up from the pin slot 110, so that the base body 200 of the robot rotates with respect to the outer frame 100 under the action of the driving force of the driving wheel. When the base body 200 rotates to a setting position, the driving wheel does not apply a rotation force any more, and the electromagnet 900 receives a signal again to allow the fixing pin 300 to be extended and pressed into the corresponding pin slot 110 on the outer frame 100, making the outer frame 100 stuck. It is ensured that the walking direction of the robot is perpendicular to corresponding sides of the supporter of cleaning cloth.

The other technical features in this embodiment, especially how to achieve a detection of whether a connection relationship between the outer frame and the base body is a locked or released state by a cooperation of the optical coupling sensor and the blocking arm 330 protruded and provided on the pin head 320, are similar to those in the first embodiment, and the description thereof is not repeated herein.

For the self-moving devices in the above-mentioned three embodiments, the walking control method of them is fundamentally that the self-moving device is controlled to perform walking and the walking unit is controlled to execute a corresponding movement command when the detection mechanism detects that the base body and the outer frame are in the engaged state. The corresponding movement command means that the movement manner of the machine body is not unique. For example, the machine body may employ various movement manners such as continuing to rotate or starting to perform walking or performing walking in a new direction, according to the actual operation situations.

Specifically, the walking control method comprises the following steps:
Step 100: the self-moving device is started up;
Step 200: the self-moving device performs walking;
Step 300: when the self-moving device detects a obstacle during the walking, the control unit controls the base body to rotate; the detection mechanism detects a position state of the base body and the outer frame; if an engaged state of the base body and the outer frame is detected, the self-moving device proceeds to step 400; otherwise, a posture adjustment is performed and the detection is repeated until the base body and the outer frame are in the engaged state; Step 400: the self-moving device continues to perform walking in a new direction.

More specifically, between the steps 100 and 200 there is a step 110: the detection mechanism detects a position state of the base body and the outer frame; if an engaged state of the base body and the outer frame is detected, the self-moving device proceeds to the step 200; otherwise, a posture adjustment is performed and the detection is repeated until the base body and the outer frame are in the engaged state.

Specifically, the step 300 comprises the following steps:
Step 310: the base body rotates with respect to the outer frame a first preset angle;
Step 320: if an engaged state of the base body and the outer frame is detected, the self-moving device proceeds to the step 400; otherwise, the base body is adjusted by rotating a second preset angle until it is determined that an engagement in place is achieved.

The self-moving device can preset different movement tracks such as a "Z" shape or "弓" shape or performing walking along an edge. As the self-moving device performs walking along different movement tracks, the rotation angles by which the base body rotates relative to the outer frame after the self-moving device becomes to contact the frame are different. The first preset angle in the step 310 is 90° or is that the base body continuously rotate 180°; and the second preset angle in the step 320 is ±15°. For example, when the self-moving device performs walking along an edge, it is necessary to control the movement of the walking unit so that the base body can successfully turn around as long as the base body rotates 90° with respect to the outer frame; and when the self-moving device performs walking in a "Z" or "弓" shape, it is necessary to control the movement of the walking unit so that the base body can rotate 180° with respect to the outer frame, i.e., the detection mechanism may detect an engagement once (the base body directly rotates 180°) or twice (a first engagement is achieved when the base body rotates 90°, and a second engagement is achieved when it continues to rotate up to 180°).

Other than the optical coupling sensor mentioned in the above-described three embodiments, the detection mechanism may also comprise a limit switch or a Hall switch as required. For example, the limit switch may be constituted by linkage members correspondingly provided on the outer frame and the fixing pin, or the Hall switch is constituted by a Hall element and a sensor correspondingly provided on the outer frame and the fixing pin.

Second Embodiment of the Detection Mechanism

Figure 7:
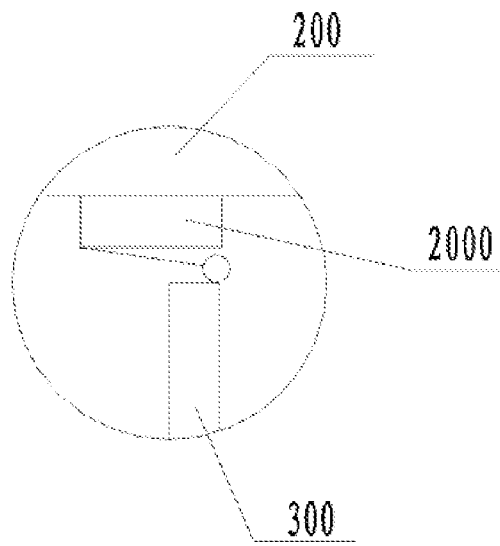
FIG. 7 is a schematic diagram of a structure according to a second embodiment of the detection mechanism of the present invention.

FIG. 7 is a schematic diagram of a structure according to a second embodiment of the detection mechanism of the present invention. As shown in FIG. 7, in the embodiment, the detection mechanism is a limit switch 2000 provided at the top of the fixing pin 300. Specifically, when the fixing pin 300 moves up and down, the top end thereof may touch the limit switch 2000. The limit switch 2000 sends a corresponding switching signal to the control unit after the limit switch 2000 is touched or released, and subsequently, the control unit controls the walking unit to execute a corresponding movement command. As shown in FIG. 7, the limit switch 2000 is provided on the base body 200. Obviously, the specific disposition position of the limit switch 2000 can be adjusted properly according to a requirement of the actual structure.

Third Embodiment of the Detection Mechanism

Figure 8:
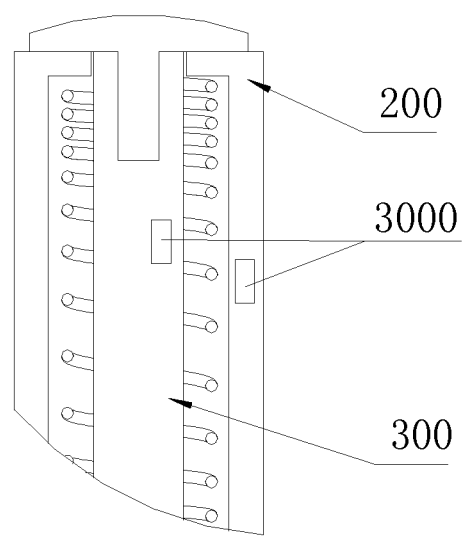
FIG. 8 is a schematic diagram of a structure according to a third embodiment of the detection mechanism of the present invention.

FIG. 8 is a schematic diagram of a structure according to a third embodiment of the detection mechanism of the present invention. As shown in FIG. 8, in the embodiment, the detection mechanism is Hall elements 3000 correspondingly provided on the fixing pin 300 and the base body 200. Specifically, when the fixing pin 300 moves up and down, the relative positions of the Hall elements 3000 respectively provided on the fixing pin 300 and the base body 200 are aligned or staggered, thus a corresponding sensing signal is sent to the control unit, and subsequently, the control unit controls the walking unit to execute a corresponding movement command. Similarly, a description is given in the embodiment only as an example, and the specific disposition position of the Hall element 3000 can be adjusted properly according to a requirement of the actual structure.

In conclusion, the present invention provides a self-moving device and a walking control method thereof which can accurately and effectively detect a connection state between a base body and an outer frame, and can by means of detection and posture adjustment, ensure that the base body and the outer frame perform walking when in an engaged state. The structure is simple and sensitivity is high.

What is claimed is:

1. A self-moving device, comprising an outer frame and a base body rotatably connected on the outer frame, wherein the base body is provided with a control unit and wheels or tracks, characterized in that, a fixing pin is connected to the base body, one end of the fixing pin is movably fixed to the base body and the other end of the fixing pin is a pin head, and a pin slot is correspondingly provided in the outer frame;

when the pin head is engaged and fixed within the pin slot, the base body is fixedly connected to and engaged with the outer frame; and when the pin head is separated from the pin slot, the base body is able to rotate with respect to the outer frame; and the base body is provided with a sensor, and when the sensor detects that the pin head is engaged and fixed within the pin slot, the control unit, according to a detection signal of the sensor, controls walking via wheels or tracks to execute a corresponding movement command, the movement command includes continuing to move or performing walking in a new direction.

2. The self-moving device according to claim 1, characterized in that, the base body is provided with an electrical motor and a cam which is driven by the electrical motor and which correspondingly drives the fixing pin to move, a spring is sleeved on the fixing pin and a blocking part is provided on the fixing pin, wherein the spring is positioned between the outer frame and the blocking part; or the base body is provided with an electromagnet, wherein the fixing pin is provided on the electromagnet and is driven by the electromagnet.

3. The self-moving device according to claim 1, characterized in that, the sensor employs a Hall sensor or a limit switch.

4. A walking control method of the self-moving device, the method comprising:

providing the self-moving device comprising an outer frame and a base body rotatably connected on the outer frame, the base body being provided with a control unit and wheels or tracks, the base body is provided with a sensor, a fixing pin being connected to the base body, one end of the fixing pin is movably fixed to the base body and the other end of the fixing pin is a pin head, and a pin slot is correspondingly provided in the outer frame, wherein when the pin head is engaged and fixed within the pin slot, the base body is fixedly connected to and engaged with the outer frame; and when the pin head is separated from the pin slot, the base body is able to rotate with respect to the outer frame; and controlling walking via wheels or tracks to execute a corresponding movement command when the sensor detects that the base body and the outer frame are in an engaged state.

5. A self-moving device, comprising an outer frame and a base body rotatably connected on the outer frame, wherein the base body is provided with a control unit and wheels or tracks, characterized in that, a fixing pin is connected to the base body, one end of the fixing pin is movably fixed to the base body and the other end of the fixing pin is a pin head, and a pin slot is correspondingly provided in the outer frame;

when the pin head is engaged and fixed within the pin slot, the base body is fixedly connected to and engaged with the outer frame; and when the pin head is separated from the pin slot, the base body is able to rotate with respect to the outer frame; and the base body is provided with a sensor, and when the sensor detects that the pin head is engaged and fixed within the pin slot, the control unit, according to a detection signal of the sensor, controls walking via wheels or tracks to execute a corresponding movement command wherein the sensor is an optical coupling sensor provided on the base body, and a blocking arm is protruded and provided at a periphery of the pin head, when the pin head is separated from the pin slot, the blocking arm is located in a signal transmission path of the optical coupling sensor; and when the pin head is engaged and fixed within the pin slot, the blocking arm is away from the signal transmission path of the optical coupling sensor.

6. The self-moving device according to claim 5, characterized in that, a spring is sleeved on the fixing pin, wherein the spring is positioned between the base body and the pin head.

7. The self-moving device according to claim 5, characterized in that, the optical coupling sensor is fixed to the base body by an optical coupling holder, wherein two ends of the optical coupling holder are correspondingly provided with a signal transmitter and a signal receiver respectively, and a gap for accommodating the blocking arm is provided between the signal transmitter and the signal receiver.

8. A walking control method of the self-moving device, the method comprising:

providing the self-moving device comprising an outer frame and a base body rotatably connected on the outer frame, the base body being provided with a control unit and wheels or tracks, the base body is provided with a sensor, a fixing pin being connected to the base body, one end of the fixing pin is movably fixed to the base body and the other end of the fixing pin is a pin head, and a pin slot is correspondingly provided in the outer frame, wherein when the pin head is engaged and fixed within the pin slot, the base body is fixedly connected to and engaged with the outer frame; and when the pin head is separated from the pin slot, the base body is able to rotate with respect to the outer frame; and controlling walking via wheels or tracks to execute a corresponding movement command when the sensor detects that the base body and the outer frame are in an engaged state, wherein the walking control method includes:

step 100: starting up the self-moving device;

step 200: the self-moving device performing walking;

step 300: controlling the base body to rotate when the self-moving device detects an obstacle during the walking; detecting a position state of the base body and the outer frame; and proceeding to step 400 if an engaged state of the base body and the outer frame is detected, otherwise, performing a posture adjustment and repeating the detecting until the base body and the outer frame are in the engaged state; and step 400: the self-moving device continuing to perform walking in a new direction.

9. The walking control method according to claim 8, characterized in that, between the steps 100 and 200 further comprising:

step 110: detecting a position state of the base body and the outer frame; and proceeding to the step 200 if an engaged state of the base body and the outer frame is detected, otherwise, performing a posture adjustment and repeating the detecting until the base body and the outer frame are in the engaged state.

10. The walking control method according to claim 8, characterized in that, the step 300 specifically comprises the following steps:

step 310: rotating the base body with respect to the outer frame a first preset angle; and step 320: proceeding to the step 400 if the engaged state of the base body and the outer frame is detected, otherwise, adjusting the base body by rotating it a second preset angle until it is determined that an engagement in place is achieved.

11. The walking control method according to claim 10, characterized in that, the first preset angle in the step 310 is 90° or is that the base body continuously rotates 180°; and the second preset angle in the step 320 is ±15°.

* * * * *